(12) United States Patent
Kamiyama

(10) Patent No.: US 10,252,201 B2
(45) Date of Patent: Apr. 9, 2019

(54) MULTILAYER FILTER MEDIUM FOR FILTER, METHOD FOR PRODUCING THE SAME, AND AIR FILTER

(71) Applicant: Teijin Limited, Osaka-shi, Osaka (JP)

(72) Inventor: Mie Kamiyama, Osaka (JP)

(73) Assignee: TEIJIN FRONTIER CO., LTD., Osaka (JP)

( * ) Notice: Subject to any disclaimer, the term of this patent is extended or adjusted under 35 U.S.C. 154(b) by 75 days.

(21) Appl. No.: 15/034,714

(22) PCT Filed: Jan. 27, 2015

(86) PCT No.: PCT/JP2015/052174
§ 371 (c)(1),
(2) Date: May 5, 2016

(87) PCT Pub. No.: WO2015/115418
PCT Pub. Date: Aug. 6, 2015

(65) Prior Publication Data
US 2016/0367922 A1    Dec. 22, 2016

(30) Foreign Application Priority Data

Jan. 28, 2014 (JP) ................................ 2014-013382

(51) Int. Cl.
*B01D 39/16* (2006.01)
*B01D 46/52* (2006.01)
(Continued)

(52) U.S. Cl.
CPC ........... *B01D 39/163* (2013.01); *B01D 39/16* (2013.01); *B01D 46/52* (2013.01); *B01D 46/521* (2013.01);
(Continued)

(58) Field of Classification Search
CPC ...... B01D 39/16; B01D 39/163; B01D 46/52; B01D 46/521; B01D 2239/025;
(Continued)

(56) References Cited

U.S. PATENT DOCUMENTS

2009/0120048 A1\* 5/2009 Wertz ................. B01D 39/1623
55/521
2011/0250816 A1   10/2011 Fujiwara et al.
(Continued)

FOREIGN PATENT DOCUMENTS

CN   103209747 A   7/2013
EP   2 633 892 A1  9/2013
(Continued)

OTHER PUBLICATIONS

Communication dated Dec. 22, 2016 from the European Patent Office in counterpart Application No. 15742683.4.
(Continued)

*Primary Examiner* — Robert Clemente
(74) *Attorney, Agent, or Firm* — Sughrue Mion, PLLC

(57) ABSTRACT

The prevent invention addresses the problem of providing a multilayer filter medium for a filter having low pressure loss and high collection efficiency, a method for producing the same, and an air filter not only having low pressure loss and high collection efficiency but also being excellent in pleatability and wind-pressure deformation resistance. The multilayer filter medium for a filter as a means for resolution is obtained by laminating a wet-laid nonwoven fabric layer (2) on a wet-laid nonwoven fabric layer (1). The wet-laid nonwoven fabric layer (1) includes a nanofiber A having a single-fiber diameter within a range of 200 to 800 nm and a fiber length within a range of 0.4 to 0.7 mm, a fiber B having a greater single-fiber diameter than the nanofiber A, and a binder fiber C. The wet-laid nonwoven fabric layer (2)
(Continued)

includes a nanofiber A having a single-fiber diameter within a range of 200 to 800 nm and a fiber length within a range of 0.4 to 0.7 mm, a fiber B having a greater single-fiber diameter than the nanofiber A, and a binder fiber C, the weight proportion of the nanofiber fiber A being greater than in the wet-laid nonwoven fabric layer (1).

10 Claims, 1 Drawing Sheet

(51) Int. Cl.
    *D21H 27/30*     (2006.01)
    *D21H 15/02*     (2006.01)
    *D21H 27/08*     (2006.01)

(52) U.S. Cl.
    CPC ............. *D21H 15/02* (2013.01); *D21H 27/08* (2013.01); *D21H 27/30* (2013.01); *B01D 2239/025* (2013.01); *B01D 2239/083* (2013.01); *B01D 2239/10* (2013.01); *B01D 2239/1225* (2013.01); *B01D 2239/1233* (2013.01); *B01D 2275/10* (2013.01)

(58) Field of Classification Search
    CPC ........ B01D 2275/10; B01D 2239/1225; B01D 2239/1233
See application file for complete search history.

(56) References Cited

U.S. PATENT DOCUMENTS

| | | | |
|---|---|---|---|
| 2013/0199141 A1* | 8/2013 | Hamada | B01D 39/163 55/486 |
| 2014/0360145 A1 | 12/2014 | Hamada et al. | |

FOREIGN PATENT DOCUMENTS

| | | |
|---|---|---|
| JP | 2003-328259 A | 11/2003 |
| JP | 2003328259 A1 * | 11/2003 |
| JP | 2004-301121 A | 10/2004 |
| JP | 2008-696 A | 1/2008 |
| JP | 2008-151980 A | 7/2008 |
| JP | 2010-077545 A | 4/2010 |
| JP | 2010-234285 A | 10/2010 |
| JP | 2011-236542 A | 11/2011 |
| JP | 2013-126626 A | 6/2013 |
| JP | 2013-193028 A | 9/2013 |
| WO | 2012/057251 A1 | 5/2012 |
| WO | 2013/094268 A1 | 6/2013 |

OTHER PUBLICATIONS

International Search Report for PCT/JP2015/052174 dated Apr. 28, 2015 [PCT/ISA/210].
Communication dated Apr. 18, 2017 from the Japanese Patent Office in counterpart Application No. 2015-559945.

* cited by examiner

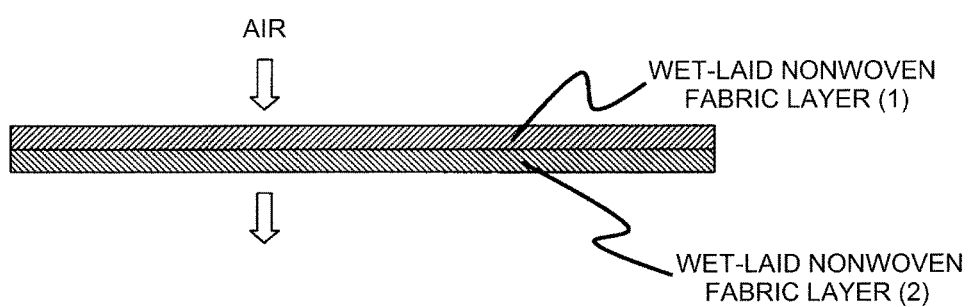

MULTILAYER FILTER MEDIUM FOR FILTER, METHOD FOR PRODUCING THE SAME, AND AIR FILTER

TECHNICAL FIELD

The present invention relates to a multilayer filter medium for a filter having low pressure loss and high collection efficiency, a method for producing the same, and an air filter not only having low pressure loss and high collection efficiency but also being excellent in pleatability and wind-pressure deformation resistance.

BACKGROUND ART

Conventionally, as filter media for filters for the purpose of air purification, etc., an electrostatic filter medium including a nonwoven fabric made of polypropylene or like synthetic fibers, a mechanical filter medium made of glass fibers, and the like are known. However, an electrostatic filter medium has a problem in that the electrostatic performance is degraded due to oil mist or moisture in the gas, resulting in a decrease in collection efficiency. In addition, a mechanical filter medium made of glass fibers has a problem in that improvement in collection efficiency leads to an increase in pressure loss, and also has the problem of disposal.

In addition, a multilayer filter medium obtained by laminating nonwoven fabrics has been proposed (see, e.g., PTLs 1 to 5). Further, a filter medium for a filter using a nanofiber has been proposed (see, e.g., PTLs 6 and 7).

However, there has been a demand for a filter medium for a filter further improved in terms of low pressure loss and high collection efficiency. Further, in addition to low pressure loss and high collection efficiency, improvement in pleatability and wind-pressure deformation resistance has also been demanded.

CITATION LIST

Patent Literature

PTL 1: JP-A-2011-236542
PTL 2: JP-A-2010-234285
PTL 3: JP-A-2008-151980
PTL 4: JP-A-2008-000696
PTL 5: JP-A-2004-301121
PTL 6: JP-A-2013-126626
PTL 7: WO 2012/057251

SUMMARY OF INVENTION

Technical Problem

The invention has been accomplished against the above background. An object of the invention is to provide a multilayer filter medium for a filter having low pressure loss and high collection efficiency, a method for producing the same, and an air filter not only having low pressure loss and high collection efficiency but also being excellent in pleatability and wind-pressure deformation resistance.

Solution to Problem

The present inventors have conducted extensive research to solve the above problems. As a result, they have found that in a multilayer filter medium for a filter, when a nanofiber, a fiber thicker than the nanofiber, and a binder fiber are used, and their proportions are devised, a multilayer filter medium for a filter having low pressure loss and high collection efficiency is obtained. As a result of further extensive research, they have accomplished the invention.

Thus, the invention provides "a multilayer filter medium for a filter, including:

a wet-laid nonwoven fabric layer (1) including a nanofiber A having a single-fiber diameter within a range of 200 to 800 nm and a fiber length within a range of 0.4 to 0.7 mm, a fiber B having a greater single-fiber diameter than the nanofiber A, and a binder fiber C, the weight ratio (A+B):C being within a range of 40:60 to 70:30; and a wet-laid nonwoven fabric layer (2) including a nanofiber A having a single-fiber diameter within a range of 200 to 800 nm and a fiber length within a range of 0.4 to 0.7 mm, a fiber B having a greater single-fiber diameter than the nanofiber A, and a binder fiber C, the weight ratio (A+B):C being within a range of 40:60 to 70:30, the weight proportion of the nanofiber A being greater than in the wet-laid nonwoven fabric layer (1)".

At this time, it is preferable that the difference between the content of the nanofiber A in the wet-laid nonwoven fabric layer (2) and the content of the nanofiber A in the wet-laid nonwoven fabric layer (1) is 3% or more. In addition, it is preferable that the wet-laid nonwoven fabric layer (1) has a weight per unit within a range of 5 to 60 g/m². In addition, it is preferable that the wet-laid nonwoven fabric layer (2) has a weight per unit within a range of 5 to 60 g/m². In addition, it is preferable that the proportion of the JIS Class-8 dust holding capacity of the wet-laid nonwoven fabric layer (1) is within a range of 60 to 97%, and the proportion of the JIS Class-8 dust holding capacity of the wet-laid nonwoven fabric layer (2) is within a range of 3 to 40%.

The invention also provides a method for producing a multilayer filter medium for a filter, the method being for producing the multilayer filter medium described above and including laminating a wet-laid nonwoven fabric layer (2) on a wet-laid nonwoven fabric layer (1), the wet-laid nonwoven fabric layer (1) being obtained using a nanofiber A having a single-fiber diameter within a range of 200 to 800 nm and a fiber length within a range of 0.4 to 0.7 mm, a fiber B having a greater single-fiber diameter than the nanofiber A, and a binder fiber C, the wet-laid nonwoven fabric layer (2) being obtained using a nanofiber A having a single-fiber diameter within a range of 200 to 800 nm and a fiber length within a range of 0.4 to 0.7 mm, a fiber B having a greater single-fiber diameter than the nanofiber A, and a binder fiber C, the weight proportion of the nanofiber A being greater than in the wet-laid nonwoven fabric layer (1). At this time, it is preferable that the nanofiber A contained in the wet-laid nonwoven fabric layer (1) and the nanofiber A contained in the wet-laid nonwoven fabric layer (2) are each a fiber obtained by cutting a sea-island composite fiber having a sea/island melt viscosity ratio of 1.1 to 2.0, a number of islands of 500 or more, and a sea/island alkali hydrolysis rate ratio of 200 or more, followed by alkaline hydrolysis to remove a sea polymer.

The invention also provides an air filter including the multilayer filter medium for a filter descried above. At this time, it is preferable that the air filter further includes a substrate layer. In addition, it is preferable that the air filter has a thickness of 0.8 mm or less. In addition, it is preferable that the air filter has a Gurley bending resistance of 2,000 mgf or more. In addition, it is preferable that the air filter is pleated. In addition, it is preferable that the wet-laid nonwoven fabric layer (1) is located on an air inlet side.

Advantageous Effects of the Invention

According to the invention, a multilayer filter medium for a filter having low pressure loss and high collection efficiency, a method for producing the same, and an air filter not only having low pressure loss and high collection efficiency but also being excellent in pleatability and wind-pressure deformation resistance are provided.

BRIEF DESCRIPTION OF DRAWINGS

FIG. 1 schematically shows the arrangement of the wet-laid nonwoven fabric layer (1) on the air inlet side in the invention.

DESCRIPTION OF EMBODIMENTS

Hereinafter, embodiments of the invention will be described in detail. In the multilayer filter medium for a filter of the invention, it is important that the nanofiber A contained in the wet-laid nonwoven fabric layer (1) has a single-fiber diameter within a range of 200 to 800 nm (preferably 400 to 800 nm). In the case where the single-fiber diameter is less than 200 nm, fibers are likely to be pseudo-stuck with each other, making uniform dispersion difficult, whereby the collection efficiency may decrease. On the other hand, also in the case where the single-fiber diameter is more than 800 nm, the effectiveness as a nanofiber decreases, whereby the collection efficiency may decrease. In the case where the single-fiber cross-sectional shape of the nanofiber A is a modified cross-section other than a round cross-section, the diameter of the circumscribed circle is taken as the single-fiber diameter. Incidentally, a single-fiber diameter can be measured by photographing a transverse cross-section of the fiber with a transmission electron microscope.

In addition, in the nanofiber A, it is important that the fiber length is within a range of 0.4 to 0.7 mm. When the fiber length is less than 0.4 mm, the fiber length is too short. As a result, entanglement with other fibers is reduced, whereby the fiber may fall down during the production process of a nonwoven fabric. On the other hand, when the fiber length is more than 0.7 mm, the fiber length is too long. As a result, the nanofiber's self-entanglement is increased to inhibit uniform dispersion, whereby the collection efficiency may decrease.

In addition, in the nanofiber A, it is preferable that the ratio of the fiber length (L) nm to the single-fiber diameter (D) nm (L/D) is 1,000 or less (more preferably 300 to 1,000).

Examples of kinds of fibers to form the nanofiber A include polyester fibers including polyesters such as polyethylene terephthalate, polytrimethylene terephthalate, polybutylene terephthalate, stereocomplex polylactic acid, polylactic acid, and polyesters copolymerized with a third component, nylon fibers, acrylic fibers, and aramid fibers. Among them, in terms of chemical resistance or production process performance, polyester fibers are preferable. Incidentally, the polyester contained in such a polyester fiber may also be a polyester obtained by material recycling or chemical recycling or a polyester obtained using a monomer component produced from a biomass raw material, i.e., a substance of biological origin, as described in JP-A-2009-091694. Further, it may also be a polyester obtained using a catalyst containing a specific phosphorus compound or titanium compound as described in JP-A-2004-270097 or JP-A-2004-211268.

The method for producing the nanofiber A is not particularly limited. However, the method disclosed in WO 2005/095686 is preferable for making the single-fiber diameter uniform.

That is, it is preferable that a sea-island composite fiber including an island component composed of a polyester polymer and having an island diameter of 200 to 800 nm and a sea component composed of a polymer that is more alkali-soluble than the polyester polymer is spun using a spinneret for sea-island composite fibers, drawn, and then subjected to alkali weight reduction to dissolve away the sea component.

Here, when the alkali dissolution rate ratio between the sea component and the island component (sea/island) is 200 or more, preferably 300 to 3,000, this results in excellent island separability and thus is preferable. Optimal examples of sea components include polylactic acid, ultra-high molecular weight polyalkylene oxide condensation polymers, and polyalkylene glycol compound/5-sodium sulfoisophthalate copolyesters. Here, the aqueous alkaline solution is an aqueous solution of potassium hydroxide or sodium hydroxide, for example. In addition to these, formic acid for fatty acid polyamides such as Nylon 6 and Nylon 66, solvents such as trichloroethylene for polystyrene and hot ethylene and xylene for polyethylene, and hot water for polyvinyl alcohols and ethylene-modified vinyl alcohol polymers may be used for each case.

In the sea-island composite fiber, it is preferable that the number of islands is 500 or more (more preferably 500 to 2,000). In addition, it is preferable that at the time of melt spinning, the melt viscosity of the sea component is higher than the melt viscosity of the island component polymer. It is particularly preferable that the sea/islands melt viscosity ratio is 1.1 to 2.0. As a result, even in the case where the island component forms 500 or more islands, and the sea component proportion is 30% or less, a thin-layer sea portion can be formed without disturbing the sea-island structure.

The spinneret for sea-island composite fibers used for melt spinning may be any spinneret, such as one having hollow pins or micropores for forming an island component. The discharged sea-island composite fiber is solidified by cooling air, and then taken up on a rotary roller set at a predetermined take-up rate, thereby forming an undrawn yarn.

The obtained undrawn yarn may be directly subjected to a cutting step or the subsequent step of dissolving the sea component. In order to fit to the intended strength, elongation, and thermal contraction characteristics, the obtained undrawn yarn may also be subjected to a drawing step or a heat-treatment step and then to a cutting step or the subsequent weight reduction step.

The composite fiber is cut and then subjected to alkali weight reduction to dissolve away the sea component, or subjected to alkali weight reduction to dissolve away the sea component and then cut; as a result, the nanofiber A is obtained.

Next, the fiber B contained in the wet-laid nonwoven fabric layer (1) is a non-binder fiber that assists the dispersion of the nanofiber and also contributes to porosity improvement. The fiber B is not particularly limited as long as the single-fiber diameter thereof is greater than that of the nanofiber A. As the kind of fiber, a polyester fiber is preferable for having a uniform fiber diameter and good dispersibility. However, according to the purpose, various kinds of fiber materials for paper are usable. For example, synthetic fibers or semisynthetic fibers including wood pulp, natural pulp, synthetic pulp containing aramid or polyethylene as a main component, nylon, acrylic, vinylon, rayon, and like components may be mixed or added.

In the fiber B, in terms of dispersibility, it is preferable that the single-fiber fineness is 0.01 to 5.0 dtex (more preferably 0.1 to 3.3 dtex, still more preferably 0.2 to 2.0 dtex). In addition, in terms of dispersibility, it is preferable that the fiber length is 1 to 10 mm (more preferably 3 to 7 mm).

In addition, the binder fiber C contained in the wet-laid nonwoven fabric layer (1) is a heat-bondable fiber and serves to provide the nonwoven fabric with improved strength, increased bulkiness owing to the network structure and contraction, etc. An undrawn fiber or composite fiber having a fiber diameter of 3 μm or more (more preferably 3 to 10 μm) is preferable. It is preferable that the single-fiber fineness is 0.1 to 3.3 dtex, more preferably 0.2 to 1.7 dtex. It is preferable that the fiber length is 3 to 10 mm.

As the binder fiber C, a preferred example of an undrawn fiber is an undrawn polyester fiber spun at a spinning rate of 600 to 1,500 m/min. Examples of polyesters include polyethylene terephthalate, polytrimethylene terephthalate, and polybutylene terephthalate. Preferably, from the reasons of productivity, dispersibility in water, etc., polyethylene terephthalate and copolyesters containing the same as a main component are preferable.

In addition, as the binder fiber C, a preferred example of a composite fiber is a core-sheath composite fiber in which a polymer component that develops a fusion-bonding effect at a dryer temperature for papermaking (e.g., amorphous copolyester, etc.) is provided as the sheath part, and another polymer having a melting point at least 20° C. higher than that of the polymer component is provided as the core part. In addition, an eccentric sheath-core composite fiber, a side-by-side composite fiber, and like modes are also usable.

Here, also in terms of cost, it is preferable that the amorphous copolyester contains terephthalic acid, isophthalic acid, ethylene glycol, and diethylene glycol as main components.

In the wet-laid nonwoven fabric layer (1), defining the weights of the nanofiber A, fiber B, and binder fiber C as A, B, and C, respectively, it is important that the weight ratio (A+B):C is within a range of 40:60 to 70:30 (preferably 50:50 to 70:30). The binder fiber C forms a fused network of binder fibers and is in charge of the framework of the nonwoven fabric structure and the strength of the nonwoven fabric itself. In the wet-laid nonwoven fabric layer (1), when the weight proportion of the binder fiber C is more than 60 wt %, contraction may occur during a Yankee dryer heat treatment, resulting in texture non-uniformity or increased variations in a fine size region, such as in the average pore size. Meanwhile, in the case where the weight proportion is less than 30 wt %, the nonwoven fabric may have insufficient strength.

In the multilayer filter medium for a filter of the invention, similarly to the wet-laid nonwoven fabric layer (1), the wet-laid nonwoven fabric layer (2) includes a nanofiber A having a single-fiber diameter within a range of 200 to 800 nm and a fiber length within a range of 0.4 to 0.7 mm, a fiber B having a greater single-fiber diameter than the nanofiber A, and a binder fiber C. However, the weight proportion of the nanofiber A in the wet-laid nonwoven fabric layer (2) is greater than in the wet-laid nonwoven fabric layer (1).

Here, the difference between the weight proportion of the nanofiber A contained in the wet-laid nonwoven fabric layer (2) and the weight proportion of the nanofiber A contained in the wet-laid nonwoven fabric layer (1) is important in terms of the performance/life of the filter. It has been said that in a laminated filter, dust concentrates at a lamination interface, causing clogging. This happens when the first layer is not provided with a dust-holding structure. In such a case, dust passes therethrough without being collected, and, as a result, collection takes place at the interface with the second layer. In addition, in the case where the two layers are structurally similar to each other, the collection of dust is almost completed in the first layer, and the presence of the second layer is meaningless. In the invention, taking this point into consideration, in order to satisfy both life and collection efficiency, a difference is provided between the weight proportion of the nanofiber fiber A contained in the wet-laid nonwoven fabric layer (2) and the weight proportion of the nanofiber fiber A contained in the wet-laid nonwoven fabric layer (1). The difference is represented by the following equation and preferably 3% or more (more preferably 3 to 30%):

Difference in weight proportion (%)=(weight proportion of the nanofiber $A$ contained in the wet-laid nonwoven fabric layer (2))−(weight proportion of the nanofiber $A$ contained in the wet-laid nonwoven fabric layer (1)).

When the difference is less than 3%, the two layers are similar to each other in collection efficiency. As a result, dust does not enter the second layer, leading to low effectiveness, and also pressure loss may increase at an early stage in the first layer. In addition, in the case where the nanofiber A is not contained in the first layer, this leads to an increased difference in contraction in the papermaking process. As a result, after the heat treatment with a dryer, undesired cracking (like cracks in the ground) may occur. In addition, when there is no nanofiber A, the dust holding performance is low, and dust passes through the layer without being corrected as described above. Accordingly, the dust classification effect of the first layer is low, and large particles enter the second layer which has higher collection efficiency. As a result, clogging may occur within a short period of time.

In the wet-laid nonwoven fabric layer (2), defining the weights of the nanofiber A, fiber B, and binder fiber C as A, B, and C, respectively, it is important that the weight ratio (A+B):C is within a range of 40:60 to 70:30 (preferably 50:50 to 70:30). The binder fiber C forms a fused network of binder fibers and is in charge of the framework of the nonwoven fabric structure and the strength of the nonwoven fabric itself. In the wet-laid nonwoven fabric layer (1), when the weight proportion of the binder fiber C is more than 60 wt %, contraction may occur during a Yankee dryer heat treatment, resulting in texture non-uniformity or increased variations in a fine size region, such as in the average pore size. Meanwhile, in the case where the weight proportion is less than 30 wt %, the nonwoven fabric may have insufficient strength.

The nanofiber A contained in the wet-laid nonwoven fabric layer (2) may be the same as or different from the nanofiber A contained in the wet-laid nonwoven fabric layer (1). In addition, the fiber B contained in the wet-laid nonwoven fabric layer (2) may be the same as or different from the nanofiber fiber B contained in the wet-laid nonwoven fabric layer (1). In addition, the binder fiber C contained in the wet-laid nonwoven fabric layer (2) may be the same as or different from the binder fiber C contained in the wet-laid nonwoven fabric layer (1).

In addition, in the multilayer filter medium for a filter of the invention, when the proportion of the JIS Class-8 dust holding capacity of the wet-laid nonwoven fabric layer (1) is within a range of 60 to 93% (more preferably 70 to 90%), and the proportion of the JIS Class-8 dust holding capacity of the wet-laid nonwoven fabric layer (2) is within a range of 7 to 40% (more preferably 10 to 30%), the two layers both exert effective dust holding performance, resulting in an increased total dust holding capacity (i.e., increased life); thus, this is preferable.

In addition, in the wet-laid nonwoven fabric layer (1) and the wet-laid nonwoven fabric layer (2), it is preferable that each layer has a weight per unit within a range of 5 to 60 g/m². When the weight per unit is more than 60 g/m², the thickness increases due to the highly porous structure. For applications to a filter with a limited space, such as a pleated filter, the filter medium insertion area is limited by the thickness. Therefore, the increased thickness may result in an increase in the structural pressure loss of the filter cartridge. On the other hand, when the weight per unit is less than 5 g/m², the collection efficiency may decrease.

In addition, in order to disperse the nanofiber A, form a highly porous structure, and obtain low pressure loss and high collection efficiency, it is preferable that the porosity of each layer is 85% or more.

Here, when the filter medium has a two-layer structure in which the wet-laid nonwoven fabric layer (2) has a smaller weight per unit and the wet-laid nonwoven fabric layer (1) collects larger particles, the pressure loss of the wet-laid nonwoven fabric layer (2) can be suppressed low, and also, because of the dust classification effect of the wet-laid nonwoven fabric layer (1) (i.e., collection of large particles), this is effective in terms of both collection efficiency and life; thus, this is preferable. Taking this point into consideration, it is preferable that the thickness is 0.8 mm or less, still more preferably 0.3 to 0.6 mm.

As a method for producing the multilayer filter medium for a filter of the invention, the following method is preferable:

a method including laminating a wet-laid nonwoven fabric layer (2) on a wet-laid nonwoven fabric layer (1), the wet-laid nonwoven fabric layer (1) being obtained using a nanofiber A having a single-fiber diameter within a range of 200 to 800 nm and a fiber length within a range of 0.4 to 0.7 mm, a fiber B having a greater single-fiber diameter than the nanofiber A, and a binder fiber C, the wet-laid nonwoven fabric layer (2) being obtained using a nanofiber A having a single-fiber diameter within a range of 200 to 800 nm and a fiber length within a range of 0.4 to 0.7 mm, a fiber B having a greater single-fiber diameter than the nanofiber A, and a binder fiber C, the weight proportion of the nanofiber fiber A being greater than in the wet-laid nonwoven fabric layer (1).

Here, it is preferable that wet-laid nonwoven fabrics are obtained by papermaking in a two-layer papermaking manner using a combination of two or more usual Fortlinear paper machines, tanmo paper machines, and cylinder paper machines, then the wet-laid nonwoven fabrics are stacked as necessary, and the binder fiber C is heat-bonded thereto with a Yankee dryer or the like. At this time, with respect to with the dryer temperature, it is preferable that the heat treatment/drying is completed at a surface temperature up to 120 to 150° C.

The multilayer filter medium for a filter thus obtained has low pressure loss and high collection efficiency.

Next, the air filter of the invention is an air filter including the multilayer filter medium for a filter described above. At this time, as shown in FIG. 1, it is preferable that the wet-laid nonwoven fabric layer (1) is located on the air inlet side.

Here, for air filters to be subjected to high or varying wind pressures, such as engine filters and high-throughput air cleaners, pleatability and wind-pressure deformation resistance are important. For this reason, it is preferable that an additional cloth having a weight per unit of 50 to 120 g/m², such as a spun-bonded nonwoven fabric, a needle-punched nonwoven fabric, or a nonwoven fabric impregnated with resin to have increased rigidity, is attached thereto as a substrate layer (aggregate).

At this time, the order of lamination is not particularly limited but is preferably, from the upstream side, as follows: substrate layer, wet-laid nonwoven fabric layer (1), wet-laid nonwoven fabric layer (2).

The method for attachment may be a method using an adhesive such as a resin spray. Alternatively, when the main constituent material of the aggregate is a polyester material and heat-fusible, attachment to the nonwoven fabrics is possible by lamination through the thermal bonding effect. In this case, it is preferable that bonding is performed with the amount of adhesive applied and the clearance at the time of lamination being set small to avoid separation, and that the air filter has a thickness of 0.8 mm or less (still more preferably 0.3 to 0.6 mm). In addition, it is preferable that the air filter has a Gurley bending resistance of 2,000 mgf or more (more preferably 2,000 to 6,000 mgf).

Such an air filter not only has low pressure loss and high collection efficiency but also is excellent in pleatability and wind-pressure deformation resistance, and is pleated as necessary before use. The air filter is suitable as an air filter for internal combustion engines (aspiration or exhaustion) of automobiles and other vehicles, an air filter for use in cabins, masks, air cleaners, building air conditioning, semiconductors, and food or pharmaceutical factories, or the like.

EXAMPLES

Next, examples of the invention and comparative examples will be described in detail, but the invention is not limited thereto. Incidentally, measurement items in the Examples were measured by the following methods.

Single-Fiber Diameter/Fineness

A fiber cross-section was cut with a sharp-edged tool, and the cross-section was observed under SEM at 2,000. The average of 100 samples was taken as the single-fiber diameter. In addition, the fineness was expressed as weight dtex per 10,000 meters.

Weight Per Unit

Weight per unit was measured in accordance with JIS P8124 (Method for Measurement of Paper Weight per Square Meter).

Thickness

Thickness was measured in accordance with JIS P8118 (Method for Measurement of Thickness and Density of Paper and Paper Board). The measurement was performed at a load of 75 g/cm², N=5, and the average was determined.

Porosity

From the above weight per unit and thickness together with the PET fiber density as 1.36 g/cm³, porosity was calculated by the following equation.

$$\text{Porosity} = 100 - (\text{weight per unit})/(\text{thickness})/1.36 \lambda 100)(\%)$$

Dust Holding Capacity: DHC/DHC Distribution

JIS Class-8 dust was introduced into a filter at a concentration of 1 g/m² and an entry rate of 10 cm/sec. The time for the pressure loss to reach 2 kPa and the weight of dust held by the filter at that time were measured and converted into a dust holding capacity per m². In addition, the layers were separated by cutting to measure the holding weight of each layer, and the holding distribution of each layer was calculated from the total weight.

Bending Resistance

Measurement was performed in accordance with JIS L1913, General Staple Fiber Nonwoven Fabric Test Method, Bending Resistance/Gurley Method, to calculate the bending resistance mgf.

Melt Viscosity

A polymer after a drying treatment is set in an orifice set at the extruder temperature for spinning, maintained in a molten state for 5 minutes, and then extruded under several levels of loads applied. The resulting shear rate and melt viscosity are plotted. A shear rate-melt viscosity curve was formed based on the data, and the melt viscosity at a shear rate of 1,000 sec$^{-1}$ was read.

Alkali Weight Reduction Rate Ratio

A sea component polymer and an island component polymer were each discharged from a spinneret having 24 round holes 0.3 mm in diameter and 0.6 mm in length and taken up at a spinning rate of 1,000 to 2,000 m/min, and the obtained undrawn yarn was drawn to give a residual elongation within a range of 30 to 60%, thereby forming a multifilament of 83 dtex/24 fil. Using a 1.5 wt % NaOH solution at 80° C., at a bath ratio 100, the weight reduction rate was calculated from the dissolution time and dissolved amount.

Example 1

A nanofiber A having a single-fiber diameter of 700 nm×0.5 mm in length (aspect ratio=714), a polyethylene terephthalate drawn fiber B having a fineness of 1.7 dtex×5 mm in length, and, as a binder fiber C, a sheath-core composite heat-bondable fiber having a fineness of 1.7 dtex×5 mm in length were prepared. The sheath-core composite heat-bondable fiber has a cross-section formed in a core polymer/sheath polymer ratio of 50/50 wt %. In addition, the core polymer is polyethylene terephthalate having a melting point of 256° C. Meanwhile, the sheath polymer is an amorphous copolyester containing terephthalic acid, isophthalic acid, ethylene glycol, and diethylene glycol as main components.

They were blended in the ratio A:B:C=1:59:40, then a suitable amount of dispersing/defoaming agent was added to cause dispersion, and the resulting slurry was subjected to wet papermaking using a cylinder machine. Meanwhile, a dispersing/defoaming agent blended in the ratio A:B:C=5:55:40 was suitably added, followed by wet papermaking using an inclined tanmo machine. They were stack together, introduced into a Yankee dryer, and dried/heat-treated.

Examples 2 to 5, 7, Comparative Examples 1 to 3

Nonwoven fabrics were produced by the same method as in Example 1, except that the blending ratio of the nanofiber A, the drawn fiber B, and the binder fiber C was changed as shown in Table 1.

Example 6

Using a fiber having a single-fiber diameter of 400 nm and a length of 0.4 mm as a nanofiber A, papermaking was performed in the same manner as in Example 1 at the blending amounts and weights per unit shown in Table 1.

Comparative Examples 4 to 5

As shown in Table 1, in Comparative Example 4, papermaking was performed using a nanofiber A having a fiber diameter of 150 nm. In addition, in Comparative Example 5, papermaking was performed using a fiber having a fiber diameter of 1.5 μm in placed of the nanofiber.

Examples 8 to 10

As shown in Table 2, a spray adhesive was melt-sprayed to a substrate layer formed of a spun-bonded nonwoven fabric made of a polyethylene terephthalate filament, followed by attachment to a wet-laid nonwoven fabric layer (1). The order of lamination was, from the upstream side (air inlet side), as follows: substrate layer, wet-laid nonwoven fabric layer (1), wet-laid nonwoven fabric layer (2).

Example 11

As shown in Table 2, a staple fiber nonwoven fabric (substrate layer) having a weight per unit of 100 g/m² formed of a card web was prepared. The card web includes a staple fiber of a polyester drawn yarn having 2.2 dtex×51 mm in length and a binder fiber of a sheath-core composite cross-sectional fiber having 2.2 dtex×51 mm in length blended in a ratio of, in this order, 60:40.

Next, using a belt laminator composed of an oven having a heater temperature of 190° C., the staple fiber nonwoven fabric (substrate layer) was heat-bonded to a wet-laid nonwoven fabric layer (1). The order of lamination was, from the upstream side (air inlet side), as follows: substrate layer, wet-laid nonwoven fabric layer (1), wet-laid nonwoven fabric layer (2).

Example 12

As shown in Table 2, a filter medium for a laminated filter was produced by the attachment processing in the same manner as in Example 10, except that a spun-bonded nonwoven fabric made of polypropylene (PP) was used as a substrate layer.

TABLE 1

|  | Example 1 | Example 2 | Example 3 | Example 4 | Example 5 | Example 6 | Example 7 |
|---|---|---|---|---|---|---|---|
| Low-Concentration Layer (1) | | | | | | | |
| Nanofiber A | 700 nm × 0.5 mm | ← | ← | ← | ← | 400 nm × 0.4 mm | 700 nm × 0.5 mm |
| Drawn Fiber B | 1.7 dtex × 5 mm | ← | ← | ← | ← | ← | ← |
| Binder Fiber C | 1.7 dtex × 5 mm | ← | ← | ← | ← | ← | ← |
| A (wt %) | 1 | 1 | 5 | 10 | 10 | 5 | 3 |

TABLE 1-continued

|  |  |  |  |  |  |  |  |
|---|---|---|---|---|---|---|---|
| B (wt %) | 59 | 59 | 55 | 50 | 50 | 65 | 57 |
| C (wt %) | 40 | 40 | 40 | 40 | 40 | 30 | 40 |
| Weight per Unit (g/m$^2$) | 30 | 30 | 30 | 30 | 30 | 15 | 30 |
| High-Concentration Layer (2) |  |  |  |  |  |  |  |
| Nanofiber A | 700 nm × 0.5 mm | ← | ← | ← | ← | 400 nm × 0.4 mm | 700 nm × 0.5 mm |
| Drawn Fiber B | 1.7 dtex × 5 mm | ← | ← | ← | ← | ← | ← |
| Binder Fiber C | 1.7 dtex × 5 mm | ← | ← | ← | ← | ← | ← |
| A (wt %) | 5 | 10 | 10 | 20 | 30 | 30 | 5 |
| B (wt %) | 55 | 50 | 50 | 40 | 30 | 40 | 55 |
| C (wt %) | 40 | 40 | 40 | 40 | 40 | 30 | 40 |
| Weight per Unit (g/m$^2$) | 30 | 30 | 30 | 30 | 30 | 15 | 30 |
| Total |  |  |  |  |  |  |  |
| Total Weight per Unit of Two Layers Prepared by Papermaking (g/m$^2$) | 60 | 60 | 60 | 60 | 60 | 30 | 60 |
| Heat Treatment | Not performed | ← | ← | ← | ← | ← | ← |
| Thickness (mm) | 0.31 | 0.32 | 0.3 | 0.3 | 0.3 | 0.16 | 0.31 |
| Porosity (%) | 85.8 | 86.2 | 85.3 | 85.3 | 85.3 | 86.2 | 85.8 |
| Pressure Loss (Pa) | 8 | 28 | 37 | 67 | 139 | 140 | 22 |
| Collection Efficiency (%), 0.3-μ particles | 31.7 | 55.1 | 70.4 | 88.8 | 98.1 | 99.5 | 43.6 |
| DHC (g/m$^2$) | 57.2 | 76.75 | 66.05 | 58.2 | 52.9 | 51.5 | 35.8 |
| DHC, low-Concentration Layer (1) (%) | 73 | 88 | 85 | 86 | 90 | 93 | 95 |
| DHC, High-Concentration Layer (2) (%) | 27 | 12 | 15 | 14 | 10 | 7 | 5 |
| Texture, Physical Properties, Etc. | Excellent | Excellent | Excellent | Excellent | Excellent | Excellent | Excellent |

|  | Comparative Example 1 | Comparative Example 2 | Comparative Example 3 | Comparative Example 4 | Comparative Example 5 |
|---|---|---|---|---|---|
| Low-Concentration Layer (1) |  |  |  |  |  |
| Nanofiber A | ← | ← | ← | 150 nm × 0.3 mm | 1.5μ × 3 mm |
| Drawn Fiber B | ← | ← | ← | ← | ← |
| Binder Fiber C | ← | ← | ← | ← | ← |
| A (wt %) | 0 | 5 | 5 | 10 | 10 |
| B (wt %) | 60 | 75 | 25 | 50 | 50 |
| C (wt %) | 40 | 20 | 70 | 40 | 40 |
| Weight per Unit (g/m$^2$) | 30 | 30 | 30 | 15 | 30 |
| High-Concentration Layer (2) |  |  |  |  |  |
| Nanofiber A | ← | ← | ← | 150 nm × 0.3 mm | 1.5μ × 3 mm |
| Drawn Fiber B | ← | ← | ← | ← | ← |
| Binder Fiber C | ← | ← | ← | ← | ← |
| A (wt %) | 5 | 10 | 10 | 30 | 30 |
| B (wt %) | 55 | 70 | 20 | 30 | 30 |
| C (wt %) | 40 | 20 | 70 | 40 | 40 |
| Weight per Unit (g/m$^2$) | 30 | 30 | 30 | 15 | 30 |
| Total |  |  |  |  |  |
| Total Weight per Unit of Two Layers Prepared by Papermaking (g/m$^2$) | 60 | 60 | 60 | 30 | 60 |
| Heat Treatment | ← | ← | ← | Not performed | Not performed |
| Thickness (mm) | 0.32 | 0.33 | 0.26 | 0.14 | 0.34 |
| Porosity (%) | 86.2 | 86.6 | 83.0 | 84.2 | 87.0 |
| Pressure Loss (Pa) | 6 | 30 | 43 | 118 | 2 |
| Collection Efficiency (%), 0.3-μ particles | 25.6 | 72.5 | 64.9 | 94.3 | 3.2 |

TABLE 1-continued

|  |  |  |  |  |  |
|---|---|---|---|---|---|
| DHC (g/m$^2$) | 47.6 | 57.2 | 35.4 | 24.3 | 89.3 |
| DHC, low-Concentration Layer (1) (%) | 55 | 87 | 58 | 78 | 55 |
| DHC, High-Concentration Layer (2) (%) | 45 | 13 | 42 | 22 | 45 |
| Texture, Physical Properties, Etc. | Cracking occurred due to contraction difference. | Due to insufficient strength, breakage was caused by securing the collection efficiency measurement holder. | The binder fiber contracted on the dryer surface, resulting in unevenness and roughness. | Poor texture | Excellent |

TABLE 2

|  | Example 8 | Example 9 | Example 10 | Example 11 | Example 12 |
|---|---|---|---|---|---|
| Low-Concentration Layer (1) |  |  |  |  |  |
| Nanofiber A | 700 nm × 0.5 mm | ← | ← | ← | ← |
| Drawn Fiber B | 1.7dtex × 5 mm | ← | ← | ← | ← |
| Binder Fiber C | 1.7dtex × 5 mm | ← | ← | ← | ← |
| A (wt %) | 1 | 10 | 10 | 1 | 10 |
| B (wt %) | 59 | 50 | 50 | 59 | 50 |
| C (wt %) | 40 | 40 | 40 | 40 | 40 |
| Weight per Unit (g/m$^2$) | 30 | 30 | 30 | 30 | 30 |
| High-Concentration Layer (2) |  |  |  |  |  |
| Nanofiber A | 700 nm × 0.5 mm | ← | ← | ← | ← |
| Drawn Fiber B | 1.7dtex × 5 mm | ← | ← | ← | ← |
| Binder Fiber C | 1.7dtex × 5 mm | ← | ← | ← | ← |
| A (wt %) | 5 | 30 | 20 | 10 | 20 |
| B (wt %) | 55 | 30 | 40 | 50 | 40 |
| C (wt %) | 40 | 40 | 40 | 40 | 40 |
| Weight per Unit (g/m$^2$) | 30 | 30 | 30 | 30 | 30 |
| Total Weight per Unit of Two Layers Prepared by Papermaking (g/m$^2$) | 60 | 60 | 60 | 60 | 60 |
| Weight per Unit of Substrate Layer (g/m$^2$) | 110 | 110 | 60 | 100 | 60 |
| Kind of Substrate Layer Polymer | PET | PET | PET | PET | PP |
| Weight per Unit (g/m$^2$) | 175 | 177 | 128 | 165 | 130 |
| Thickness (mm) | 0.66 | 0.63 | 0.45 | 0.73 | 0.57 |
| Porosity (%) | 80.5 | 79.3 | 79.1 | 83.4 | 83.2 |
| Pressure Loss (Pa) | 16 | 163 | 89 | 37 | 75 |
| Collection Efficiency (%), 0.3-μ particles | 35.3 | 99.9 | 93.7 | 59.6 | 90.6 |
| DHC (g/m$^2$) | 90.6 | 152.2 | 88 | 91 | 97.4 |
| DHC, Low-Concentration Layer (1) (%) | 11 | 11 | 15 | 11 | 18 |
| DHC, high-Concentration Layer (2) (%) | 5 | 1 | 3 | 4 | 3 |
| DHC, Substrate (%) | 84 | 88 | 82 | 85 | 79 |
| Bending Resistance (mgf) | 4,772 | 5,074 | 2,546 | 4,254 | 1,969 |
| Pleating Properties | Excellent | Excellent | Excellent | Excellent | Slightly insufficient |

PET: Polyethylene terephthalate
PP: Polypropylene

Hereinafter, the results of the examples and comparative examples will be described.

With respect to the filter media obtained in Examples 1 to 5, because of the difference in nanofiber A blending concentration, dust distribution ratio between the two layers was good, and the filter media were excellent in life and collection efficiency. In addition, with respect to the filter medium obtained in Example 6, as a result of the use of the nanofiber A having a single-fiber diameter of 400 nm to reduce the weight per unit, the filter medium had low pressure loss and high collection efficiency. With respect to the filter medium obtained in Example 7, because the difference between the concentration of the nanofiber A in the high-concentration layer and that in the low-concentration layer was as small as 2%, the classification-sharing effect between the two layers was low, and dust collection was mostly performed in the low-concentration layer; as a result, the total DHC amount was smaller than in Example 1.

In addition, with respect to the filter medium obtained in Comparative Example 1, because the low-concentration layer contained no nanofiber A, the collection efficiency on the low-concentration layer side was low. In addition, a difference in contraction between the two layers occurred on the dryer surface, resulting in undesirable cracking in the width direction. With respect to the filter medium obtained in Comparative Example 2, because the weight proportion of the binder fiber C was as low as 20%, network formation by the binder fiber C was insufficient, thereby providing a nonwoven fabric with insufficient strength/hardness and low performance in shaping such as pleating. On the other hand, in Comparative Example 3, because the binder fiber C was blended in a large amount, uneven contraction and roughening occurred on the dryer surface, resulting in uneven filter performance. In Comparative Example 4 in which a nanofiber of 150 nm was used, dispersibility in water and filterability were low, resulting in a poor texture. Accordingly, although the pressure loss was high, the collection efficiency was low. In Comparative Example 5 in which a microfiber was used, although the life was long, the collection efficiency was low.

In Examples 8 to 10, because a spun-bonded nonwoven fabric composed of a polyethylene terephthalate filament was used as a substrate layer, whereby the bending rigidity (bending resistance) was high, the pleatability was excellent. In addition, in Example 11, because a polyester staple-fiber card web was used as a substrate layer, the pleatability was excellent. Meanwhile, in Example 12, a polypropylene span-bonded fabric was used as a substrate layer. Due to the polymer-derived softness, the bending rigidity (bending resistance) was not enough, and the pleatability was slightly insufficient.

INDUSTRIAL APPLICABILITY

According to the invention, a multilayer filter medium for a filter having low pressure loss and high collection efficiency, a method for producing the same, and an air filter not only having low pressure loss and high collection efficiency but also being excellent in pleatability and wind-pressure deformation resistance are provided. The industrial value thereof is extremely high.

The invention claimed is:
1. A multilayer filter medium for a filter, comprising:
a wet-laid nonwoven fabric layer (1) including a nanofiber A having a single-fiber diameter within a range of 200 to 800 nm and a fiber length within a range of 0.4 to 0.7 mm, a fiber B having a greater single-fiber diameter than the nanofiber A, and a binder fiber C, the weight ratio (A+B):C being within a range of 40:60 to 70:30; and
a wet-laid nonwoven fabric layer (2) including a nanofiber A having a single-fiber diameter within a range of 200 to 800 nm and a fiber length within a range 0.4 to 0.7 mm, a fiber B having a greater single-fiber diameter than the nanofiber A, and a binder fiber C, the weight ratio (A+B):C being within a range of 40:60 to 70:30, the weight proportion of the nanofiber A being greater than in the wet-laid nonwoven fabric layer (1),
wherein the proportion of the JIS-Class 8 dust holding capacity of the wet-laid nonwoven fabric layer (1) is within a range of 60 to 97%, and the proportion of the JIS Class-8 dust holding capacity of the wet-laid nonwoven fabric layer (2) is within a range of 3 to 40%, and
the multilayer filter medium has a thickness of 0.8 mm or less, and
the multilayer filter has a Gurley bending resistance of 2000 to 6000 mgf.
2. The multilayer filter medium for a filter according to claim 1, wherein the difference between the content of the nanofiber A in the wet-laid nonwoven fabric layer (2) and the content of the nanofiber A in the wet-laid nonwoven fabric layer (1) is 3% or more.
3. The multilayer filter medium for a filter according to claim 1, wherein the wet-laid nonwoven fabric layer (1) has a weight per unit within a range of 5 to 60 g/m².
4. The multilayer filter medium for a filter according to claim 1, wherein the wet-laid nonwoven fabric layer (2) has a weight per unit within a range of 5 to 60 g/m².
5. A method for producing a multilayer filter medium for a filter,
the method being for producing the multilayer filter medium for a filter according to a claim 1 and comprising laminating a wet-laid nonwoven fabric layer (2) on a wet-laid nonwoven fabric layer (1),
the wet-laid nonwoven fabric layer (1) being obtained using a nanofiber A having a single-fiber diameter within a range of 200 to 800 nm and a fiber length within a range of 0.4 to 0.7 mm, a fiber B having a greater single-fiber diameter than the nanofiber A, and a binder fiber C,
the wet-laid nonwoven fabric layer (2) being obtained using a nanofiber A having a single-fiber diameter within a range of 200 to 800 nm and a fiber length within a range of 0.4 to 0.7 mm, a fiber B having a greater single-fiber diameter than the nanofiber A, and a binder fiber C, the weight proportion of the nanofiber A being greater than in the wet-laid nonwoven fabric layer (1).
6. The method for producing a multilayer filter medium for a filter according to claim 5, wherein the nanofiber A contained in the wet-laid nonwoven fabric layer (1) and the nanofiber A contained in the wet-laid nonwoven fabric layer (2) are each a fiber obtained by cutting a sea-island composite fiber having a sea/island melt viscosity ratio 1.1 to 2.0, a number of islands of 500 or more, and a sea/island alkali hydrolysis rate ratio of 200 or more, followed by alkaline hydrolysis to remove a sea polymer.
7. An air filter comprising the multilayer filter medium for a filter according to claim 1.
8. The air filter according to claim 7, wherein the air filter further includes a substrate layer.
9. The air filter according to claim 7, being pleated.

10. The air filter according to claim 7, wherein the wet-laid nonwoven fabric layer (1) is located on an air inlet side.

\* \* \* \* \*